(12) United States Patent
Shin et al.

(10) Patent No.: US 7,818,737 B2
(45) Date of Patent: Oct. 19, 2010

(54) VIDEO DEVICE HAVING SOFTWARE UPGRADE FUNCTION USING WIRELESS COMMUNICATION AND METHOD FOR CONTROLLING THE SAME

(75) Inventors: Su Hyun Shin, Daegu (KR); Dong Gyun Ahn, Jecheon-si (KR); Sang Won Yoon, Daegu (DE)

(73) Assignee: LG Electronics Inc., Seoul (KR)

( * ) Notice: Subject to any disclaimer, the term of this patent is extended or adjusted under 35 U.S.C. 154(b) by 1235 days.

(21) Appl. No.: 11/345,287

(22) Filed: Feb. 2, 2006

(65) Prior Publication Data

US 2007/0006210 A1    Jan. 4, 2007

(30) Foreign Application Priority Data

| Feb. 3, 2005 | (KR) | 10-2005-0010023 |
| Aug. 25, 2005 | (KR) | 10-2005-0078367 |
| Aug. 26, 2005 | (KR) | 10-2005-0079040 |
| Aug. 30, 2005 | (KR) | 10-2005-0080152 |

(51) Int. Cl.
*G06F 9/44* (2006.01)
*G06F 9/45* (2006.01)

(52) U.S. Cl. .................. 717/168; 717/173; 709/203
(58) Field of Classification Search ......... 717/168–174; 709/203–204
See application file for complete search history.

(56) References Cited

U.S. PATENT DOCUMENTS

| 5,666,293 | A | * | 9/1997 | Metz et al. .................. 709/220 |
| 6,119,157 | A | * | 9/2000 | Traversat et al. ............ 709/220 |
| 6,161,126 | A | * | 12/2000 | Wies et al. .................. 709/203 |
| 6,279,153 | B1 | * | 8/2001 | Bi et al. ...................... 717/171 |
| 6,397,385 | B1 | * | 5/2002 | Kravitz ....................... 717/173 |
| 6,675,382 | B1 | * | 1/2004 | Foster ......................... 717/177 |
| 6,771,290 | B1 | * | 8/2004 | Hoyle .......................... 715/745 |
| 6,886,029 | B1 | * | 4/2005 | Pecus et al. .................. 709/203 |
| 6,976,079 | B1 | * | 12/2005 | Ferguson et al. ............ 709/229 |
| 7,082,603 | B2 | * | 7/2006 | Hisatake ...................... 717/173 |
| 7,089,550 | B2 | * | 8/2006 | Bakke et al. ................ 717/173 |

(Continued)

FOREIGN PATENT DOCUMENTS

CN    1251489    4/2000

(Continued)

OTHER PUBLICATIONS

Luo et al, "Unequal error protection of multiple programs based on lenghth varibale transport stream packets", IEEE, pp. 280-284, 2008.*

(Continued)

*Primary Examiner*—Anil Khatri
(74) *Attorney, Agent, or Firm*—KED & Associates, LLP

(57) ABSTRACT

A method and apparatus for upgrading software of a video device is disclosed. A software program associated with the video device is downloaded using wireless communication to upgrade the video device. This allows the software program to be more quickly downloaded. The apparatus includes a tuner unit, a storage unit, and a controller. The tuner unit receives a plurality of ROM files into which a software program associated with a video device has been divided. The storage unit stores the received ROM files. The controller reads the stored ROM files and upgrades the video device.

19 Claims, 15 Drawing Sheets

U.S. PATENT DOCUMENTS

| | | | |
|---|---|---|---|
| 7,206,852 B2 * | 4/2007 | Ferguson et al. | 709/229 |
| 7,293,279 B1 * | 11/2007 | Asmussen | 725/102 |
| 7,356,577 B2 * | 4/2008 | Collins | 709/221 |
| 7,478,381 B2 * | 1/2009 | Roberts et al. | 717/168 |
| 7,484,207 B2 * | 1/2009 | Sato | 717/174 |
| 7,509,636 B2 * | 3/2009 | McGuire et al. | 717/168 |
| 7,565,680 B1 * | 7/2009 | Asmussen | 725/135 |
| 7,673,297 B1 * | 3/2010 | Arsenault et al. | 717/168 |
| 2002/0120885 A1 | 8/2002 | Choi et al. | |

FOREIGN PATENT DOCUMENTS

| | | |
|---|---|---|
| JP | 2000-115650 | 4/2000 |
| JP | 2002-077030 | 3/2002 |
| JP | 2003-304458 | 10/2003 |
| KR | 2001-100328 | 11/2001 |
| KR | 2002-69911 | 9/2002 |
| KR | 2002-72633 | 9/2002 |
| KR | 10-2003-0033886 | 5/2003 |
| KR | 10-2005-0028117 | 3/2005 |
| KR | 2005-33158 | 4/2005 |

OTHER PUBLICATIONS

Tai et al, "Protecting distributed software upgrades that involve message passing interface changes", IEEE COMPSAC, pp. 1-6, 2003.*
Itani et al, "Petra: a secure and energy efficient software update protocol for severely constrained network devices", ACM Q2SWinet, pp. 37-43, 2009.*
Patel et al, "Upgrading transport protocols using untrusted mobile code", ACM SOSP, pp. 1-14, 2003.*
Korean Office Action dated Jul. 26, 2007.
Chinese Office Action dated Oct. 17, 2008.
European Search Report dated Dec. 11, 2008.
"Digital Video Broadcasting (DVB); Specification for System Software Update in DVB Systems; ETSI TS 102 006", ETSI Standards, LIS, Sophia Antipolis Cedex, France, vol. BC, No. V1.31. May 1, 2007.
Chinese Office Action dated Apr. 11, 2008.
Korean Office Actions dated Sep. 13, 2006 and Nov. 14, 2006.

* cited by examiner

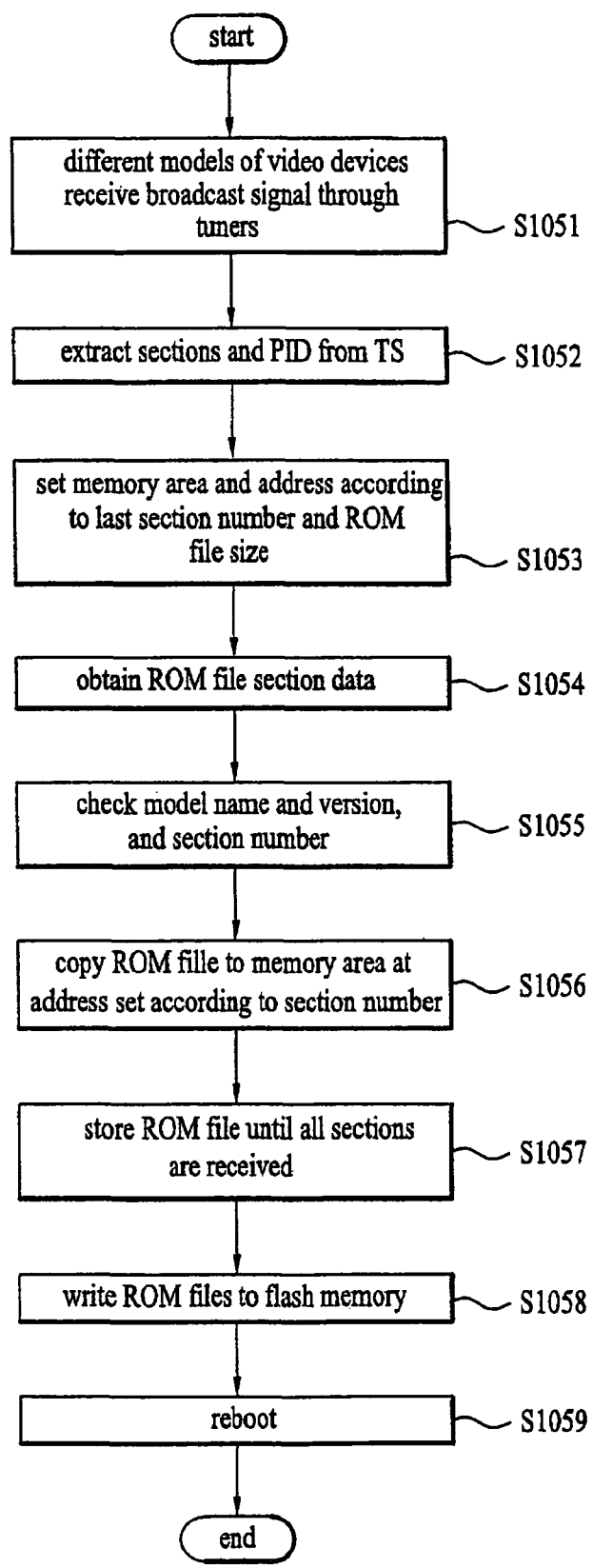

VIDEO DEVICE HAVING SOFTWARE UPGRADE FUNCTION USING WIRELESS COMMUNICATION AND METHOD FOR CONTROLLING THE SAME

This application claims the benefit of the Korean Patent Applications No. 10-2005-0010023 filed on Feb. 3, 2005, No. 10-2005-0078367 filed on Aug. 25, 2005, No. 10-2005-0079040 filed on Aug. 26, 2005 and No. 10-2005-0080152 filed on Aug. 30, 2005, which is hereby incorporated by reference as if fully set forth herein.

BACKGROUND OF THE INVENTION

1. Field of the Invention

The present invention relates to a video device and a method for controlling the same, and more particularly, to a video device having a software upgrade function using wireless communication and a method for controlling the same, whereby a software program associated with the video device can be downloaded using wireless communication to upgrade the video device so that the software program can be more quickly downloaded.

2. Discussion of the Related Art

Broadcasting is mass media for the general public, which is mainly classified into analog and digital broadcasting. In digital broadcasting, all types of data such as video data, audio data, and text data are processed in digital format so that the amount of data can be reduced by using compression technique such as those used for compressing data in computers.

Digital broadcasting can transmit a single High Definition Television (HDTV)-level program over a general analog channel and can also transmit three or more Standard Definition Television (SDTV)-level programs over a general analog channel. Digital broadcasting transfers and processes signals in digital format so that it can output a cleaner image.

Digital broadcasting can also automatically remove overlapped images (ghost images) caused by radio waves reflected from obstacles. Also, by providing HDTV-level programs, digital broadcasting allows users to enjoy, at home, a realistic image and a realistic surround sound that have previously been only available at the theater.

Digital broadcasting can also add and transmit additional data.

For example, the additional data may include a variety of real-time information such as information regarding broadcast programs, stock, exchange rates, or weather forecasts, and may also include Internet information.

Digital broadcasting is characterized in that it can provide two-way and multimedia broadcasts.

Contrary to conventional analog broadcasts which are unidirectionally provided, two-way digital broadcasts allow two-way communication of information between viewers and a broadcaster. Through digital broadcasts, the viewer can receive a variety of additional interactive information such as news, weather, and broadcast program information from the broadcaster.

The viewer can also receive desired information by accessing an information service provider, which provides additional information, through a telephone line or a separate, dedicated line. An example broadcast receiver capable of receiving two-way broadcasts is an interactive TV.

The multimedia broadcasting is a type of digital broadcasting that provides a program in conjunction with additional information in multimedia format so that both the program and the additional information are displayed and thus the viewer can select and obtain desired information while viewing the program.

Digital TVs will be developed so as to have a structure combining functions associated with the two-way and multimedia broadcasts.

Digital broadcasting also broadcasts a variety of information including Internet information. This allows the viewer to obtain Internet information through the digital TV without using any computer. Thus, the digital TV has a very high development potential.

The performance of a variety of electronic devices including TVs has been significantly improved in terms of functionality and software as well as in terms of hardware.

Software programs must be incorporated into a variety of digital electronic devices when the products are put on the market. Such software programs are used to control interoperations between the digital electronic devices or the respective operations thereof.

The software programs also need to be upgraded to provide further improvement in the performance of the products.

FIG. 1 is a block diagram of a conventional system for upgrading software of a video device.

The operating principle of the conventional software upgrade system is described below with reference to FIG. 1.

The conventional software upgrade system includes a TV 100 and a software upgrade device 120.

The software upgrade device 120 is connected to an RS-232C cable port 102 of the TV 100 to perform a software upgrade operation.

The software upgrade device 120 may be, for example, a desktop or laptop computer in which a software program for upgrade has been initially stored or a software program downloaded from other media has been stored.

A more detailed description will now be given of how the conventional software upgrade system constructed as described above operates.

First, at the manufacturing plant, the software upgrade device 120 is connected to an RS-232C cable port 102 of a TV 100 whose hardware assembly has been completed.

An operator or user operates the software upgrade device 120 to transmit a software program stored in the software upgrade device to the TV 100.

Upon receiving the software program, a controller 101 in the TV 100 upgrades a software program of the TV 100 by writing the received software program to a memory 103 in the TV 100.

When the software upgrade is completed, the connection between the software upgrade device 120 and the TV 100 is terminated. The software upgrade device 120 is then connected to another TV and the above software upgrade process is repeated.

However, the conventional method for upgrading software of a video device has the following problems.

First, in order to download upgraded software programs of a plurality of video devices (for example, digital TVs), it is necessary to repeat the cable connection and disconnection processes, which increases the time required to complete the software upgrade process and decreases the software upgrade efficiency.

Second, packets of a transport stream of a software program associated with a video device must be transmitted in order, which increases the time required to download the software program and the time required to upgrade the video device.

Third, there is no method for transmitting a plurality of software programs simultaneously to different models of video devices.

Fourth, when two or more controllers, including a controller for digital processing, are present in a single video device, only the controller for digital processing can download a software program for upgrade of the video device and other controllers cannot download the software program.

SUMMARY OF THE INVENTION

Accordingly, the present invention is directed to a video device having a software upgrade function using wireless communication and a method for controlling the same that substantially obviate one or more problems due to limitations and disadvantages of the related art.

An object of the present invention is to provide a video device having a software upgrade function using wireless communication and a method for controlling the same, wherein software programs can be downloaded to a plurality of video devices without using a cable.

Another object of the present invention is to provide a video device having a software upgrade function using wireless communication and a method for controlling the same, wherein the video device can be quickly upgraded even if packets of a transport stream of a software program for upgrading the video device are received in arbitrary order.

Another object of the present invention is to provide a video device having a software upgrade function using wireless communication and a method for controlling the same, wherein, even when different models of video devices are present, they can be simultaneously upgraded by simultaneously transmitting a plurality of software programs to them.

A further object of the present invention is to provide a video device having a software upgrade function using wireless communication and a method for controlling the same, wherein, when two or more controllers are present in a single video device, software programs associated with all the controllers can be downloaded and the controllers can be upgraded with the downloaded software programs.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for upgrading software of a video device using wireless communication comprises dividing a software program for storage in the video device into a plurality of Read Only Memory (ROM) files; inserting the divided ROM files into TS packets; up-converting the TS packets including the ROM files inserted therein into a radio frequency and transmitting the TS packets according to a wireless communication scheme; and storing the ROM files included in the TS packets in a memory.

In another aspect of the present invention, an apparatus for upgrading software of a video device using wireless communication comprises a tuner unit for receiving a plurality of ROM files into which a software program associated with a video device has been divided; a storage unit for storing the received ROM files; and a controller for reading the stored ROM files and upgrading the video device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10B is a flow chart of a third embodiment of the operation of a receiving side of a software download system using wireless communication according to the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
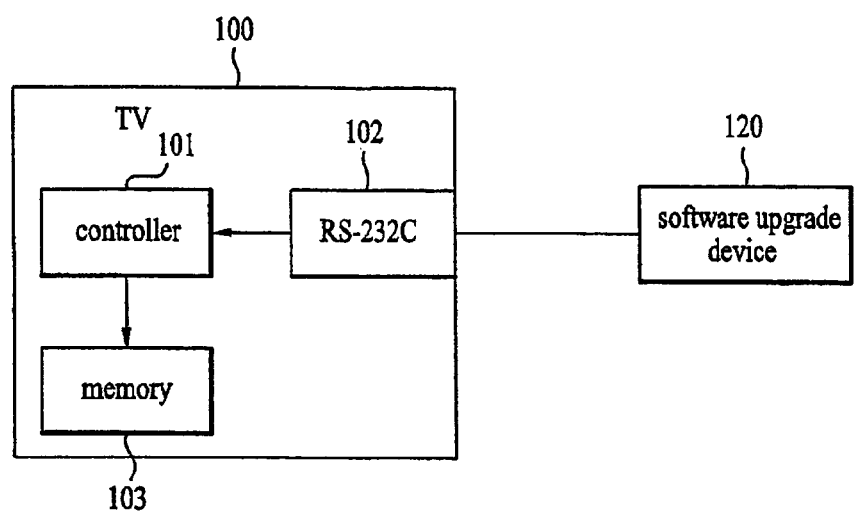
FIG. 1 is a block diagram of a conventional system for upgrading software of a video device.
Figure 2:
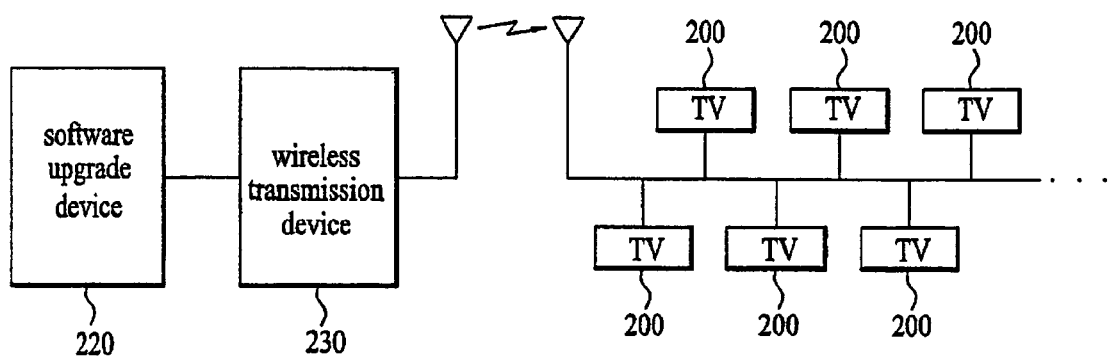
FIG. 2 is a block diagram of a software download system using wireless communication according to the present invention.

FIG. 2 is a block diagram of a software download system using wireless communication according to the present invention. The software download system using wireless communication will now be described with reference to FIG. 2.

The software download system according to the present invention includes a software upgrade (or download) device 220, a wireless transmission device 230, and a plurality of video devices (for example, televisions) 200.

In order to transmit a software program to the video devices 200, the software upgrade device 220 may include a computer or the like in which the software program has been stored. The software upgrade device 220 transmits the software program to the wireless transmission device 230. For example, the software upgrade device 220 may transmit the software program to the wireless transmission device 230 through its own operating unit (for example, a keyboard).

The software upgrade device 220 and the wireless transmission device 230 are connected to each other via RS-232 or through a conventional network (for example, Internet).

Although not shown in FIG. 2, the software upgrade device 220 and the wireless transmission device 230 may also communicate a software program with each other according to a wireless communication scheme (for example, infrared or Bluetooth).

The wireless transmission device 230 receives a software program for download or upgrade, inserts the software program into Transport Stream (TS) packets, converts the TS packets into a format that can be transmitted according to a wireless communication scheme, and transmits the converted TS packets.

The TS packets transmitted according to a wireless communication scheme are received by tuners in the video devices 200 and are then written to memories (for example, flash memories) in the video devices 200.

Figure 3A:
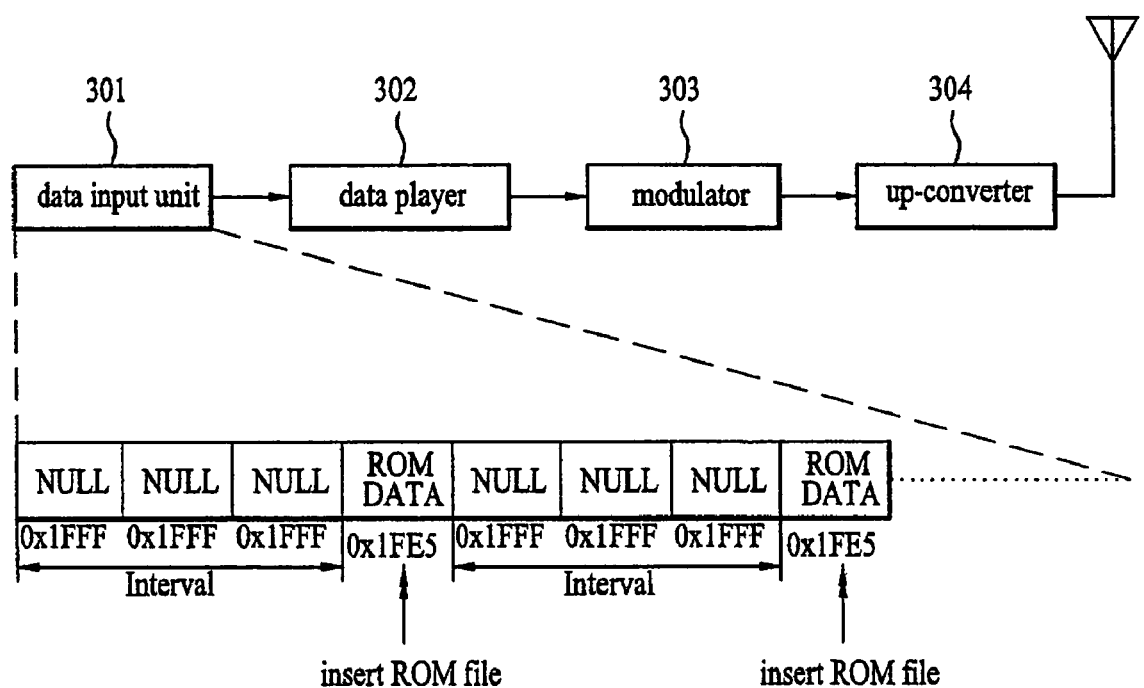
FIG. 3A illustrates a first embodiment of a transmitting side of the software download system shown in FIG. 2.

FIG. 3A illustrates a first embodiment of a transmitting side of the software download system shown in FIG. 2. The operation process of the transmitting side of the software download system and an example method for dividing and transmitting a software program will now be described with reference to FIGS. 2 and 3A.

The transmitting side of the software download system according to the present invention includes a data input unit 301, a data player 302, a modulator 303, and an up-converter 304.

Figure 5A:
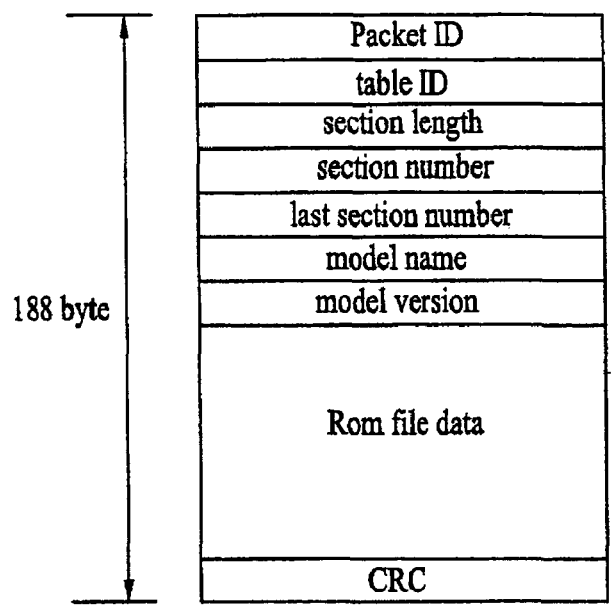
FIG. 5A illustrates a first embodiment of a section structure of a TS packet in a software download system using wireless communication according to the present invention.
Figure 5B:
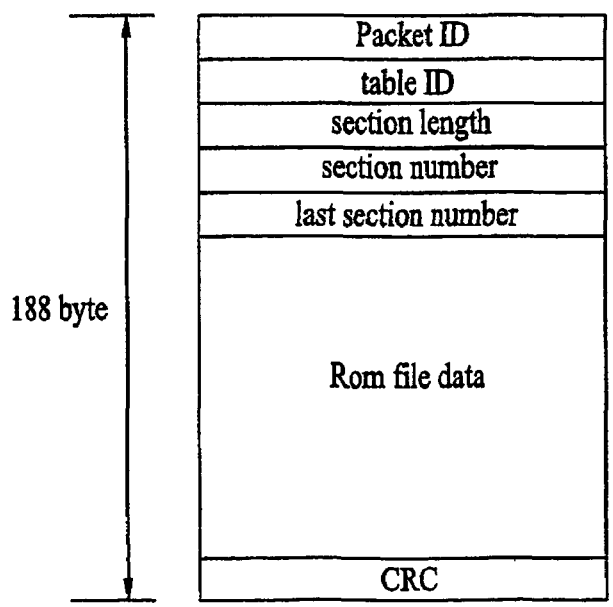
FIG. 5B illustrates a second embodiment of a section structure of a TS packet in a software download system using wireless communication according to the present invention.
Figure 5C:
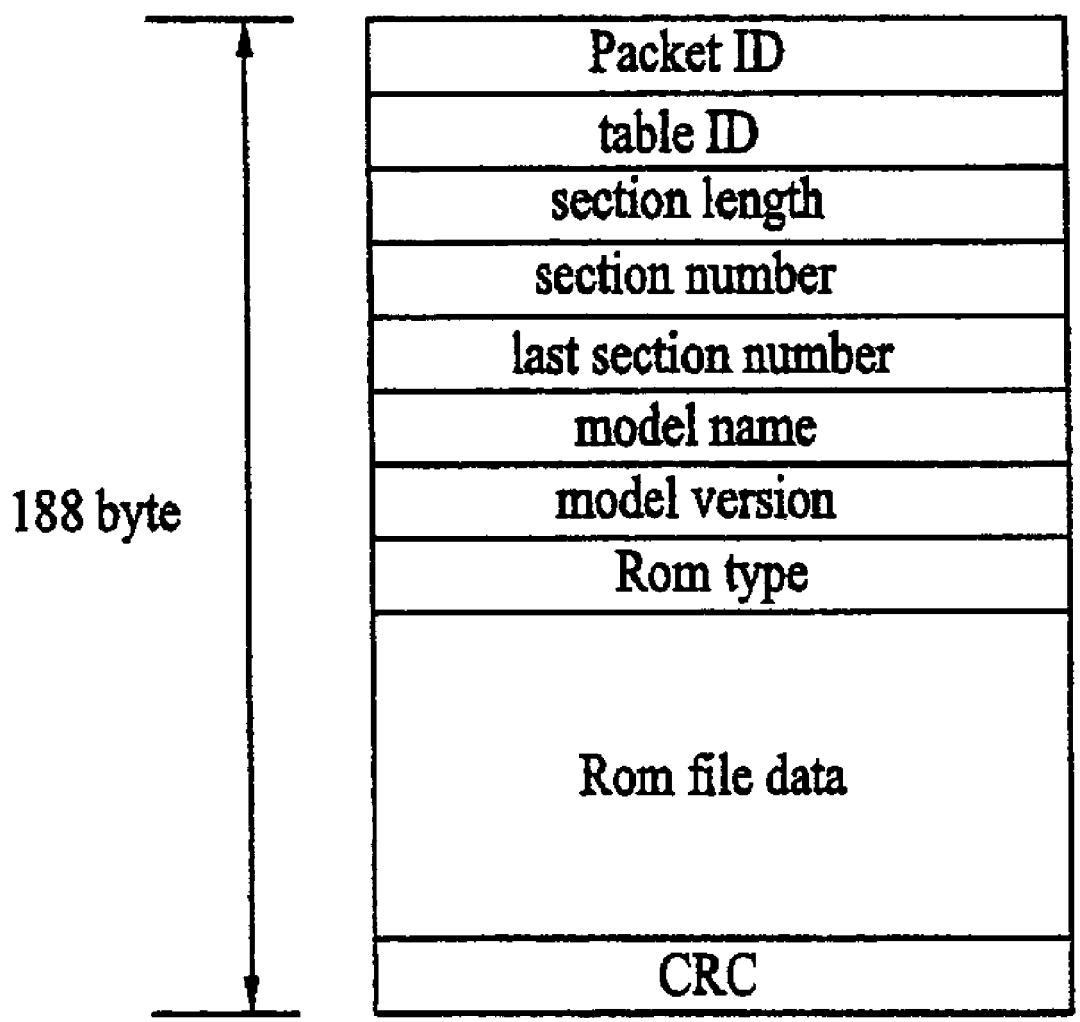
FIG. 5C illustrates a third embodiment of a section structure of a TS packet in a software download system using wireless communication according to the present invention.

The data input unit 301 receives a software program for download from the software upgrade device 220, divides the received software program into Read Only Memory (ROM) files, and inserts the ROM files into section structures of section data elements as shown in FIGS. 5A, 5B, and 5C according to the Moving Picture Experts Group (MPEG) 2 standard.

That is, section data elements are obtained from a transport stream according to a basic MPEG scheme.

The section structure of each TS packet has a Packet Identifier (PID) and a table ID and also has error checking bytes (for example, Cyclic Redundancy Checking bytes) which must exactly match a value calculated at the receiving side.

The procedure for inserting ROM files into TS packets is performed in the following manner. As shown in FIG. 3A, a software program for transmission is divided into a plurality of ROM files, and the divided ROM files are inserted between null packets arranged at specific intervals according to field tests or experimental results.

Each of the ROM files inserted between the null packets includes a variety of information such as a PID and a table ID that will be described later.

When receiving a large amount of data simultaneously, the receiving side (for example, the video device 200) of the software download system according to the present invention may fail to properly download the data. To prevent this download failure, the ROM files are inserted at specific intervals as described above.

The data player 302 reproduces TS packets (for example, MPEG2 files) including ROM files inserted therein, transmitted from the data input unit 301, at a specific transfer rate, and transmits the TS packets to the modulator 303.

The modulator 303 modulates the TS packets, which have been transmitted at the specific transfer rate, into transmission data.

The up-converter 304 up-converts the transmission data modulated by the modulator 303 into a radio frequency (RF) band that can be tuned by tuners of the video device 200, and wirelessly transmits the up-converted data through an antenna.

The section structure of the TS packet will be described later with reference to FIGS. 5A, 5B, and 5C.

Figure 3B:
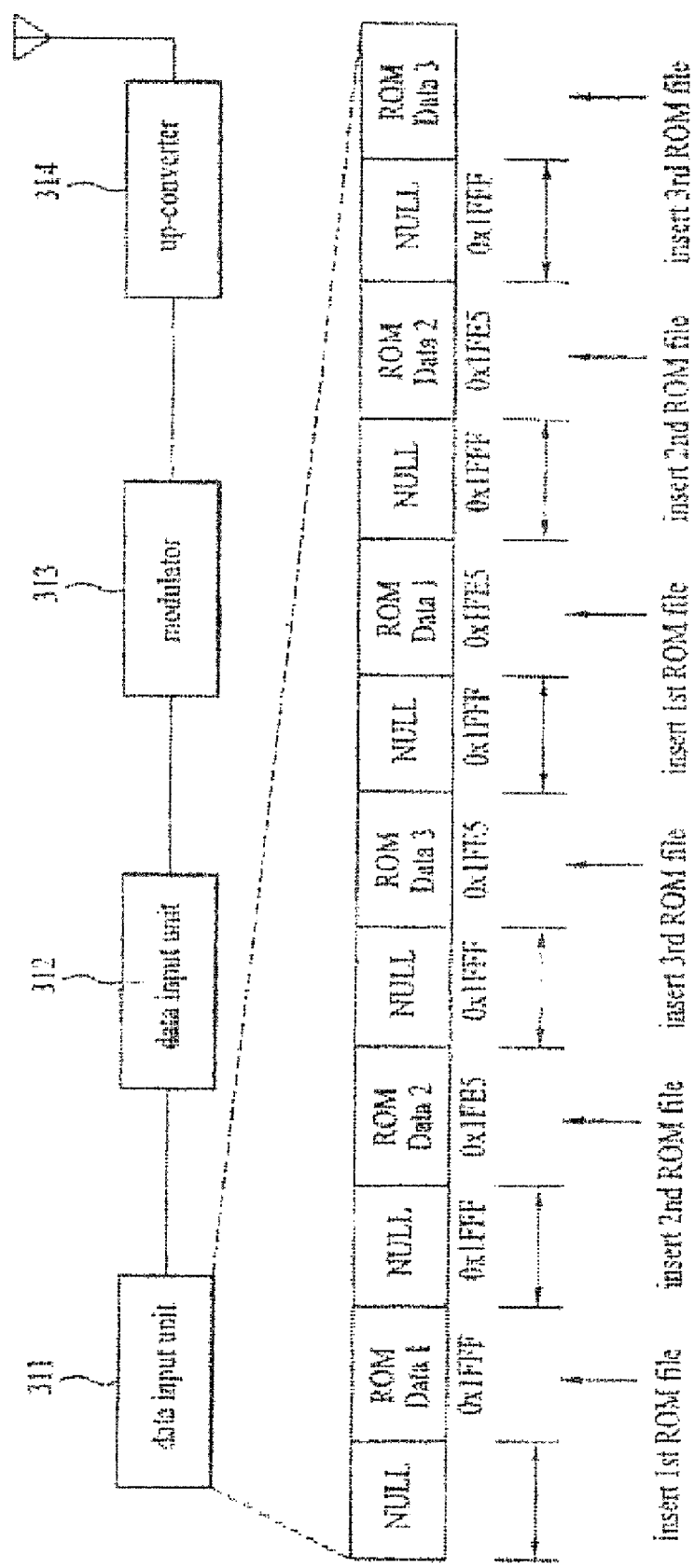
FIG. 3B illustrates a second embodiment of a transmitting side of the software download system shown in FIG. 2.

FIG. 3B illustrates a second embodiment of a transmitting side of the software download system shown in FIG. 2. The operation process of the transmitting side of the software download system and an example method for dividing and transmitting software programs will now be described with reference to FIGS. 2 and 3B. The second embodiment of FIG. 3B has an advantage over the first embodiment of FIG. 3A when transmitting two or more software programs of different types.

A data input unit 311, a data player 312, a modulator 313, and an up-converter 314 included in the transmitting side shown in FIG. 3B basically have the same functions as the data input unit 301, the data player 302, the modulator 303, and the up-converter 304 included in the transmitting side shown in FIG. 3A.

However, the data input unit 301 included in the transmitting side shown in FIG. 3B receive two or more types of software programs for download from the software upgrade device 220, divide the received software programs into two or more types of ROM files, and insert the ROM files into section structures of section data elements according to the Moving Picture Experts Group (MPEG) 2 standard.

For example, two or more types of ROM files can be inserted into a transport stream in the case where software is transmitted using an over-the-air download (OAD) scheme, particularly, when two or more models of video devices are present. For example, when three models of video devices are present, first ROM files, second ROM files, and third ROM files are inserted into a transport stream as shown in FIG. 3B.

In other words, ROM files into which different types of software programs have been divided are inserted between null packets arranged at certain intervals.

Accordingly, software programs associated with two or more models of video devices can be transmitted over each OAD channel. Thus, a variety of models of video devices can download their associated software programs over a single channel.

When an OAD channel is used for a specific video device, other models of video devices cannot receive their associated software programs simultaneously. This problem is solved by implementing the TS as shown in FIG. 3B, which increases the channel utilization ratio and efficiency.

Figure 4:
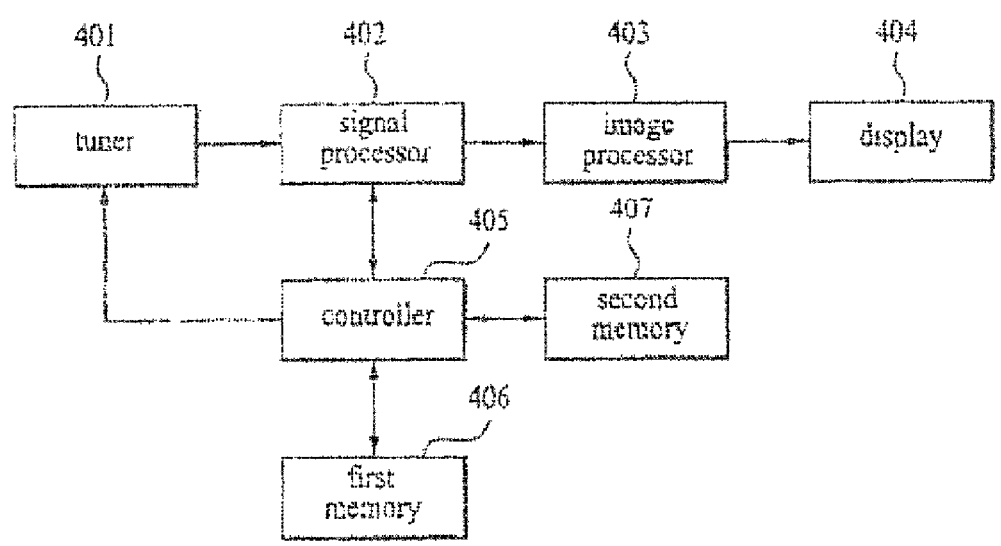
FIG. 4 is a block diagram of an example of a receiving side of the software download system shown in FIG. 2.

FIG. 4 is a block diagram of an example of the receiving side of the software download system shown in FIG. 2.

FIG. 5A illustrates a first embodiment of a section structure of a TS packet in a software download system using wireless communication according to the present invention.

FIG. 5B illustrates a second embodiment of a section structure of a TS packet in a software download system using wireless communication according to the present invention.

A description will now be given, with reference to FIGS. 4, 5A, and 5B, of how the receiving side of the software download system receives software programs transmitted from the transmitting side thereof and upgrades the video device.

The receiving side of the software download system according to the present invention includes a tuner unit 401, a signal processor 402, a video processor 403, a display unit 404, a controller 405, a first memory 406, and a second memory 407.

The tuner unit 401 tunes in to a broadcast channel and receives a transport stream (TS) carried in a corresponding radio frequency transmitted through the antenna of the transmitting side.

The signal processor 402 demodulates the broadcast channel into a signal including video, audio, and packet data, and transmits demodulated TS packets to the controller 405.

The video processor 403 performs processing such as scaling on the video data processed by the signal processor 402 so that the video data can be displayed on the display unit 404.

The display unit 404 displays video and information data.

The controller 405 controls the overall operation of the receiving side (for example, the display device 200) of the software download system. The controller 405 checks a Packet Identifier (PID) in a section structure (see FIGS. 5A and 5B), which is a TS packet (i.e., a section data element) associated with a software program of the video device 200, to determine whether or not the TS packet is a preset specific packet, i.e., whether or not the TS packet is associated with the software program of the video device.

The controller 405 checks a model name and a model version in a first section data element and sequentially downloads ROM file data of the first to the last section data elements to the first memory 406. When ROM file data of all section data elements have been downloaded to the first memory 406, the controller 405 writes the ROM file data in the first memory 406 to the second memory 407.

Specifically, the controller 405 checks the model name and version in the first section data element and checks PIDs, table IDs, and section numbers of the second to the last section data elements to sequentially download ROM files of the first to the last section data elements.

Section structures of TS packets according to the present invention will now be described in more detail with reference to FIGS. 5A and 5B.

Specific values, which can specify software programs associated with the video device, are used for PIDs of the section data elements, and such specific values are also used for table IDs thereof.

The "section length" field of each section data element indicates the length of the section data element, which specifies the position of a CRC value in the section data element.

The "section number" field of each section data element indicates an ordinal number of the section data element, and the "section number" field of the last section data element indicates the total number of section data elements, whereby the receiving side can determine which section data element is currently received.

The "ROM file data" field contains data of one of the ROM files into which a software program for transmission has been divided.

The model name and model version fields are included in the section structure of FIG. 5A and are not included in the section structure of FIG. 5B. The section structure of FIG. 5A indicates the first section data element and the section structure of FIG. 5B indicates each of the first to the last section data elements.

By inserting the model name and model version information only in the first section data element, it can be determined that the subsequently transmitted section data elements belong to a software program associated with a video device of a specific model identified by the first section data element.

A sufficient space for data can be secured since model name and model version information may not be inserted in the second to the last section data elements.

The first memory 406 can be composed of a temporary memory such as a Dynamic RAM (DRAM) and the second memory 407 can be composed of a readable/writable flash memory or the like.

FIG. 5C illustrates a third embodiment of a section structure of a TS packet in a software download system using wireless communication according to the present invention.

A description will now be given, with reference to FIGS. 4 and 5C, of how the receiving side of the software download system receives software programs transmitted from the transmitting side thereof and upgrades the video device. The embodiment of FIG. 5C has an advantage over the embodiments of FIGS. 5A and 5B described above in that the receiving side can receive software programs at a higher rate.

As shown in FIG. 5C, the first to the last section structures have the same structure. Specifically, the first to the last section structures are all set to include model name and model version information, so that the receiving side can receive a desired software program normally by checking model name and model version information of each of the section structures even if the section structures are not sequentially transmitted.

The section structures of FIG. 5C include ROM type information, contrary to those of FIGS. 5A and 5B. The ROM type information specifies the type of ROM file data (or specifies processing associated with the ROM file data) since different types of ROM file data of different types of downloaded software programs must be stored at different positions depending on the types of the downloaded software programs.

This is because, for example, a software program responsible for a booting process of the receiving side (for example, the video device 200) of the software download system and a main software program responsible for the overall operation thereof are stored in the second memory 407 at different positions.

A tuner unit 401, a signal processor 402, a video processor 403, a display unit 404, a controller 405, a first memory 406, and a second memory 407, which constitute the receiving side of the software download system of the embodiment of FIG. 5C, basically have the same functions as described above with reference to FIGS. 4, 5A, and 5B.

The controller 405 of the receiving side that receives section structures of TS packets shown in FIG. 5C has a slightly different function from the controller 405 of the receiving side that receives section structures of TS packets shown in FIGS. 5A and 5B.

Specifically, the controller 405 of the receiving side that receives section structures of TS packets illustrated in FIG. 5C controls the overall operation of the receiving side (for example, the video device 200) of the software download system. The controller 405 checks a Packet Identifier (PID) in a section structure (see FIG. 5C), which is a TS packet (i.e., a section data element) associated with a software program of the video device 200, to determine whether or not the TS packet is a preset specific packet, i.e., whether or not the TS packet is associated with the software program of the video device.

The controller 405 checks a model name, a model version, and a section number in each section data element and downloads ROM file data of the first to the last section data elements to the first memory 406 in arbitrary order. When ROM file data of all section data elements have been downloaded to the first memory 406, the controller 405 writes the ROM file data in the first memory 406 to the second memory 407.

The controller 405 can predetermine the size of a software program for download by multiplying the size of the ROM file data by the last section number that indicates the number of all section data elements. Based on the determined software program size, the controller 405 previously sets memory areas and addresses associated with the software program for download.

The controller 405 can initially download ROM file data of each section data element to the first memory 406 at an address thereof that corresponds to the section number of the section data element even when the section data element is not the first section data element.

When the first section structure is configured as shown in FIG. 5A and each of the second to the last section structures is configured as shown in FIG. 5B, the section structures must be downloaded, starting from the first section structure, since only the first section structure includes model name and model version information. However, when each of the first to the last section structures is configured as shown in FIG. 5C, the section structures can be downloaded in any order, thereby reducing the time required to download the section structures.

Figure 6:
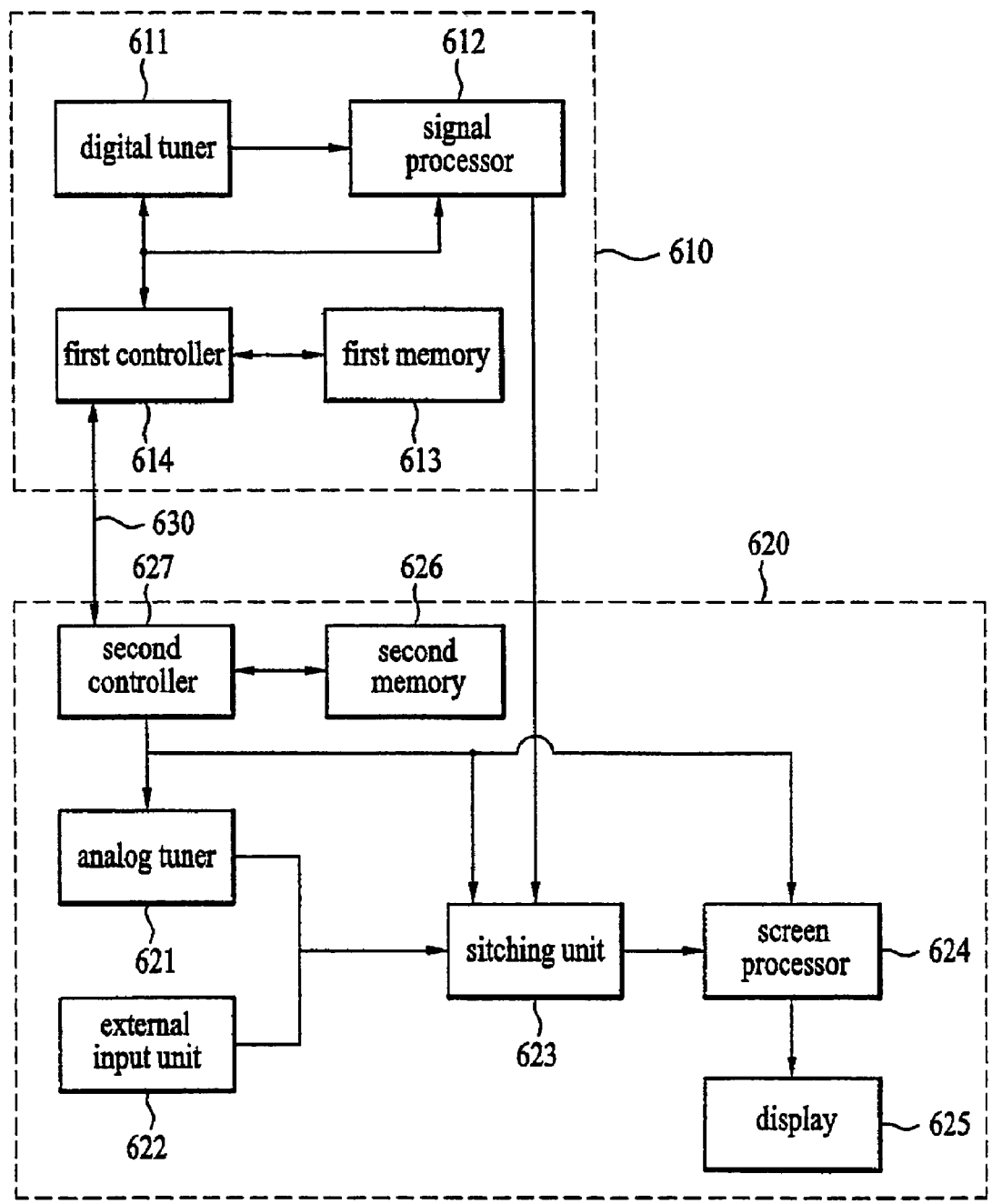
FIG. 6 is a block diagram of a receiving side of a software download system using wireless communication according to the present invention when two or more controllers are present.

FIG. 6 is a block diagram of a receiving side of a software download system using wireless communication according to the present invention when two or more controllers are present. A description will now be given, with reference to FIG. 6, of how two or more controllers included in a single video device are upgraded simultaneously.

The receiving side of the software download system using wireless communication may be, for example, a digital TV. The digital TV includes a digital broadcast signal processor 610 and an image processor 620 as shown in FIG. 6.

The digital broadcast signal processor 610 receives a digital broadcast signal and performs processes such as demodulation and decoding on the received digital broadcast signal.

The image processor 620 performs image processing on a signal processed by the digital broadcast signal processor 610 so that it can be output through the screen.

The digital broadcast signal processor 610 includes a digital tuner 611, a signal processor 612, a first memory 613, and a first controller 614.

The digital tuner 611 receives a broadcast signal. The broadcast signal may include a software program associated with the digital TV.

The signal processor 612 performs demodulation and decoding processes on the received broadcast signal.

The first memory 613 stores a drive software program for driving the first controller 614.

The first controller 614 downloads a software program included in the broadcast signal and determines whether the downloaded software program is associated with the first controller 614 or with the second controller 627. Depending on the result of the determination, the first controller 614 upgrades the drive software program stored in the first memory 613 with the downloaded software program or transfers the downloaded software program to the second controller 627.

The first controller 614 stores therein IDs of the first and second controllers 614 and 627 and version information of the drive software program. The first controller 614 compares the IDs and version information stored therein with IDs and version information included in the software program included in the broadcast signal and determines whether the software program included in the broadcast signal is associated with the first controller 614 or with the second controller 627.

The image processor 620 includes an analog tuner 621, an external input unit 622, a switching unit 623, a screen processor 624, a display unit 625, a second memory 626, and a second controller 627.

The switching unit 623 selects and outputs one of the output of the signal processor 612, the output of the analog tuner 621, and the output of the external input unit 622 so that it is transferred to the screen processor 624.

The screen processor 624 processes the output of the switching unit 623 so that it is displayed on the screen of the display unit 625.

The second memory 626 stores a drive software program for driving the second controller 627.

The second controller 627 upgrades the drive software program stored in the second memory 626 using the software program received from the first controller 614.

As described above, the first controller 614 stores therein IDs of the first and second controllers 614 and 627 and version information of the drive software program. The first controller 614 compares the IDs and version information stored therein with IDs and version information included in the software program included in the broadcast signal and determines whether the software program included in the broadcast signal is associated with the first controller 614 or with the second controller 627.

When it is determined that the software program included in the broadcast signal is associated with the second controller 627, the first controller 614 transfers the software program to the second controller 627.

A communication line 630 for transferring the software program is connected between the first controller 614 and the second controller 627. The communication line may be, for example, a Universal Asynchronous Receiver Transmitter (UART), Universal Serial Bus (USB), or RS-232C line.

Figure 7:
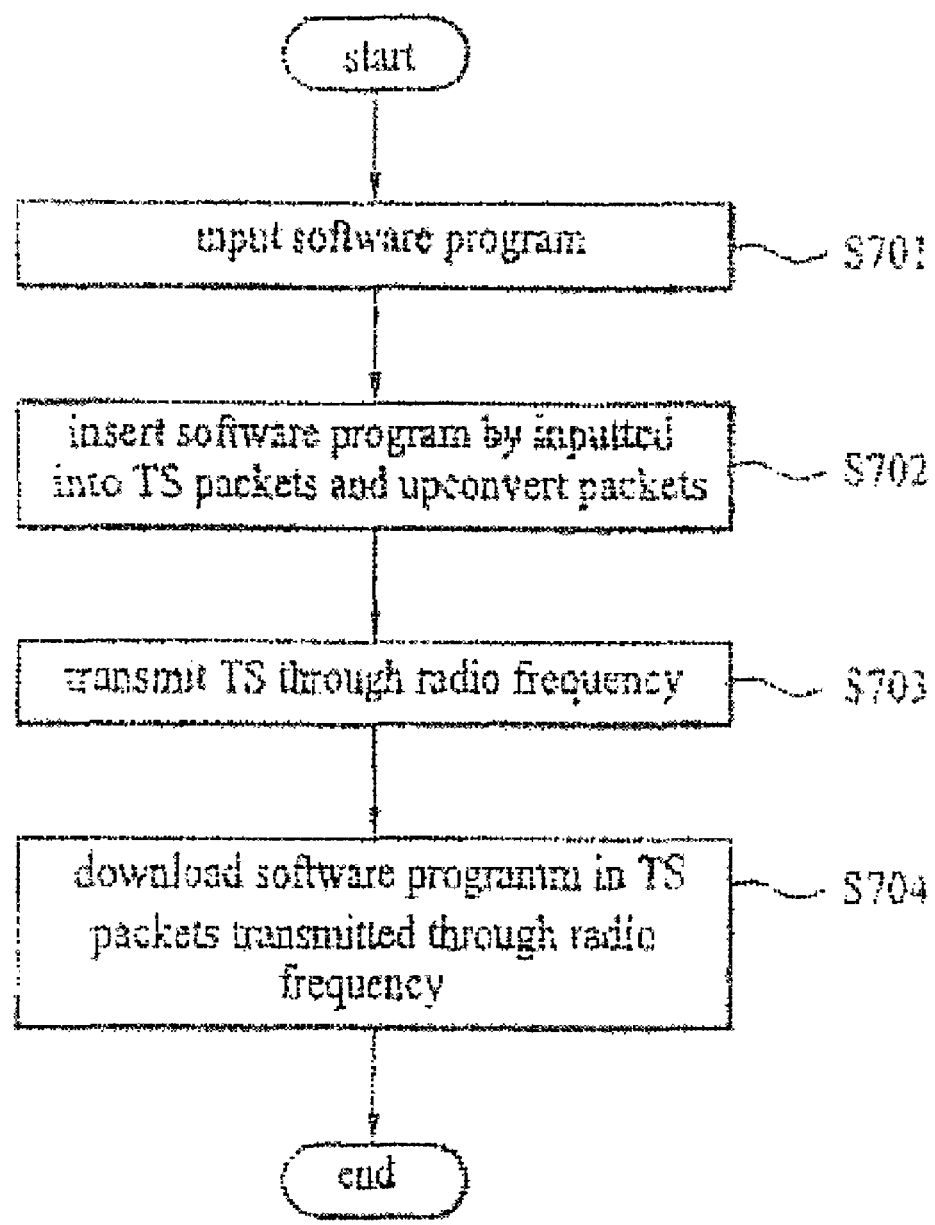
FIG. 7 is a flow chart of a first embodiment of a control method of a software download system using wireless communication according to the present invention.

FIG. 7 is a flow chart of a first embodiment of a control method of a software download system using wireless communication according to the present invention. The embodiment of the control method of the software download system using wireless communication according to the present invention will now be described with reference to FIG. 7.

The software upgrade device 220 inputs a software program, which is to be written to the video device 200, through the wireless transmission device 230 (S701).

Upon receiving the software program, the wireless transmission device 230 modulates the software program by inserting it into Transport Stream (TS) packets and up-converts a TS including the packets according to a wireless communication scheme (S702).

The wireless transmission device 230 then wirelessly transmits the up-converted TS through the antenna (S703).

The video device 200 (for example, a Digital TV) at the receiving side demodulates packets associated with the software program from the TS wirelessly received through the tuner unit 401 and writes the demodulated packets to the second memory 407 (S704).

Figure 8A:
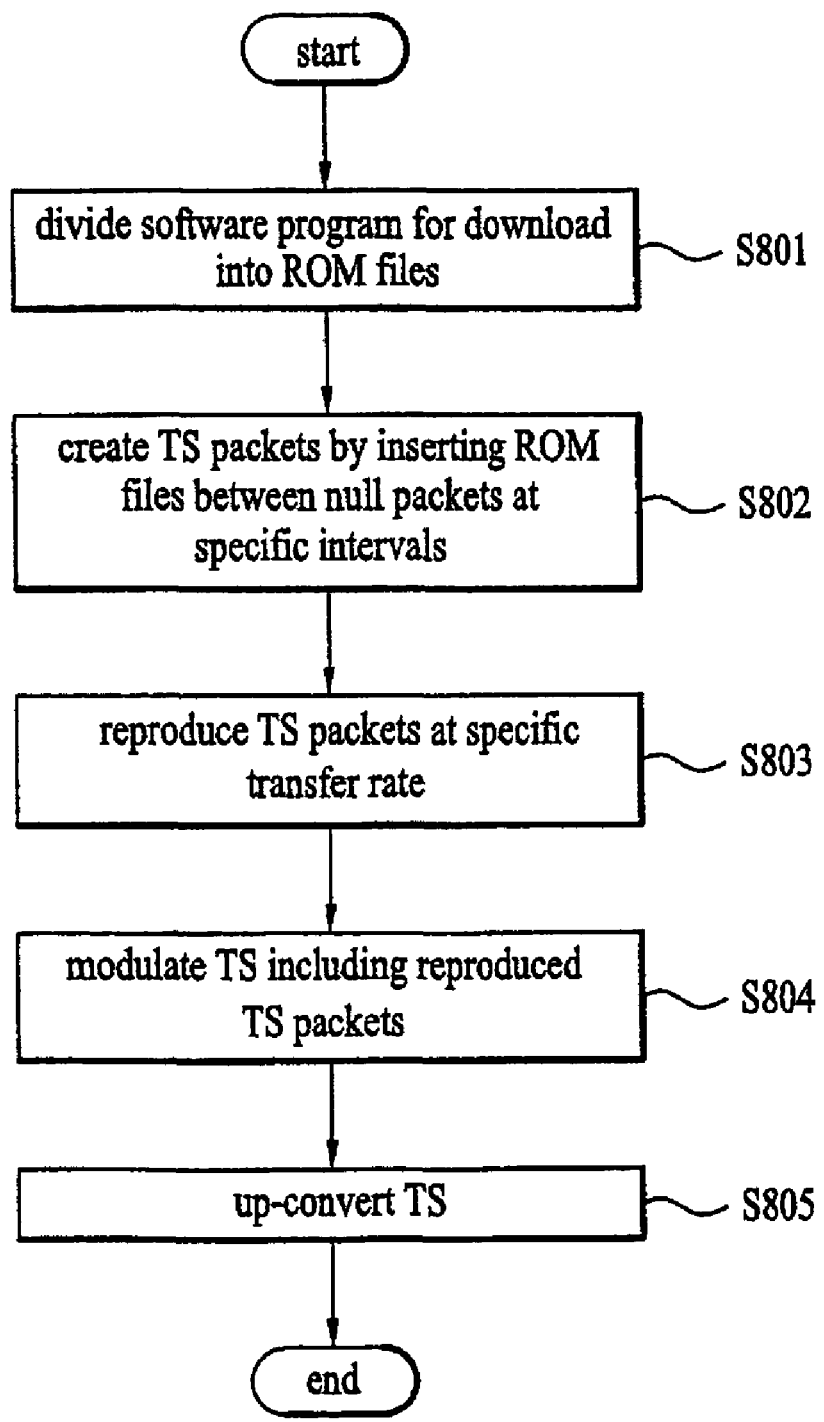
FIG. 8A is a flow chart of a first embodiment of the operation of a transmitting side of a software download system using wireless communication according to the present invention.

FIG. 8A is a flow chart of a first embodiment of the operation of a transmitting side of a software download system using wireless communication according to the present invention. An example of the operation of the transmitting side of the software download system using wireless communication according to the present invention will now be described with reference to FIG. 8A.

The steps of inserting an input software program into TS packets and up-converting the TS packets in the operation of the transmitting side in the software download procedure according to the present invention include steps S801, S802, S803, S804, and S805 as follows.

First, a software program for download is divided into a plurality of ROM files (S801).

The divided ROM files are inserted between null packets arranged at preset intervals to create TS packets associated with the software program (S802).

The first of the section data elements that constitute the TS packets associated with the software program includes a PID, a table ID, a section length, a section number, a last section number, a model name, a model version, ROM file data, and CRC information (see FIG. 5A).

Each of the second to the last section data elements includes a PID, a table ID, a section length, a section number, a last section number, ROM file data, and CRC information (see FIG. 5B).

The created TS packets are reproduced at a specific transfer rate (S803).

A TS including the reproduced TS packets is modulated (S804).

The modulated TS is up-converted so that it can be transmitted according to a wireless communication scheme (S805).

Figure 8B:
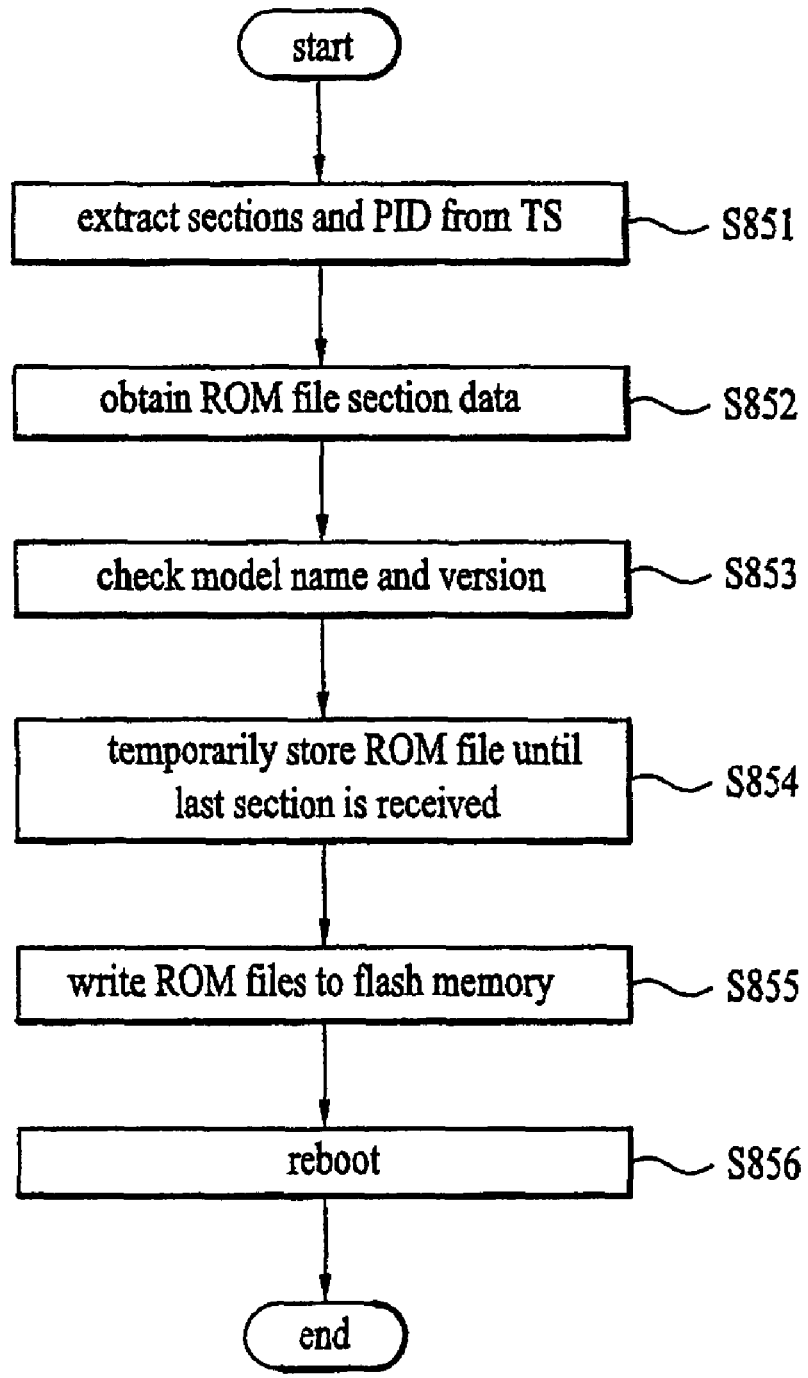
FIG. 8B is a flow chart of a first embodiment of the operation of a receiving side of a software download system using wireless communication according to the present invention.

FIG. 8B is a flow chart of a first embodiment of the operation of a receiving side of a software download system using wireless communication according to the present invention. An example of the operation of the receiving side of the software download system using wireless communication according to the present invention will now be described with reference to FIG. 8B.

The steps of demodulating packets associated with a software program from a TS wirelessly received through the tuner unit 401 and writing the demodulated packets to the second memory 407 in the operation of the receiving side (i.e., the video device 200 such as a digital TV) in the software download procedure according to the present invention include steps S851, S852, S853, S854, S855, and S856 as follows.

First, a broadcast signal is received through the tuner unit 401. From a PID in TS packet data processed by the signal processor 402, the controller 405 determines whether or not it is necessary to download the TS packet data to a memory (for example, the second memory) 407 of the video device 200, i.e., whether or not a software program associated with the video device 200 is included in the received broadcast signal. When a software program associated with the video device 200 is included in the received broadcast signal, the controller 405 performs filtering to extract section data elements corresponding to the software program (S851).

Then, the contents of each of the section data elements are parsed to obtain section number and section length information as shown in FIGS. 5A and 5B and to obtain core section data, which is actual ROM file data, from each section data element (S852).

Here, it is determined whether or not a model name and a model version in the first section data element configured as shown in FIG. 5A are identical to those of the video device 200 (S853). When it is determined that the model names and versions are not identical, the procedure for downloading the software program is not performed.

When it is determined that the model names are identical and the model version of the received software program is an upgraded version, a memory area for downloading the software program is allocated in the first memory, and ROM file data of the section data elements, starting from the first section data element, are sequentially copied to the first memory. When reception of a section data element has been interrupted due to bad broadcast environments, the process of copying ROM file data of the section data element to the first memory is suspended until the interrupted section data element is received.

No memory area is allocated in the first memory for any section data element that has already been copied or downloaded. Specifically, since reception of a section data element may be interrupted, the section number of each section data element is compared with the section number of the last copied section data element. Only when the section number of the section data element is one greater than that of the last copied section data element, the section data element is received and copied to the first memory and all the remaining section data elements are discarded. The process described above is repeated so that the first to the last section data elements are sequentially copied to the first memory (S854).

When all section data elements up to and including the last section data element have been copied, a CRC or checksum of the ROM file data in the first memory 406 is calculated to determine whether or not an error has occurred. If no error has occurred, the ROM file data is decompressed (for example according to the MPEG2 standard) and is then written to the second memory 407 (S855).

When it is determined, based on the calculated CRC or checksum, that an error has occurred, the required software program must be downloaded again.

When the software program for download or upgrade has been normally downloaded to the second memory 407, the video device 200 is rebooted (S856).

Figure 9A:
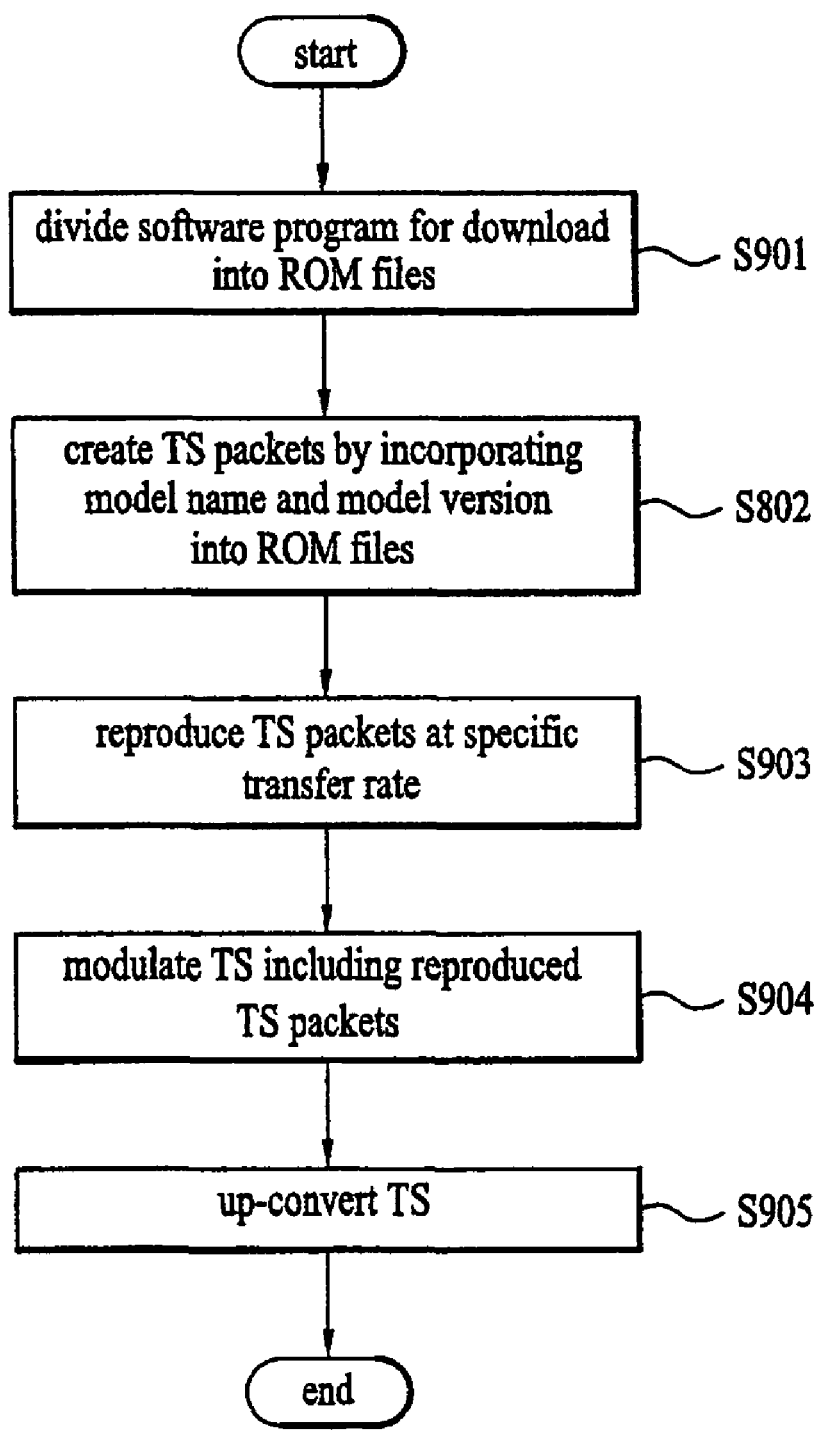
FIG. 9A is a flow chart of a second embodiment of the operation of a transmitting side of a software download system using wireless communication according to the present invention.

FIG. 9A is a flow chart of a second embodiment of the operation of a transmitting side of a software download system using wireless communication according to the present invention. Another example of the operation of the transmitting side of the software download system using wireless communication according to the present invention will now be described with reference to FIG. 9A.

The steps of inserting an input software program into TS packets and up-converting the TS packets in the operation of the transmitting side in the software download procedure according to the present invention include steps S901, S902, S903, S904, and S905 as follows.

First, a software program for download is divided into a plurality of ROM files (S901).

The divided ROM files are inserted between null packets arranged at preset intervals to create TS packets associated with the software program, each of which includes model name and model version information (S902).

Each of the first to the last section data elements that constitute the TS packets associated with the software program includes a PID, a table ID, a section length, a section number, a last section number, a model name, a model version, a ROM type, ROM file data, and CRC information (see FIG. 5C).

The created TS packets are reproduced at a specific transfer rate (S903).

A TS including the reproduced TS packets is modulated (S904).

The modulated TS is up-converted so that it can be transmitted according to a wireless communication scheme (S905).

Figure 9B:
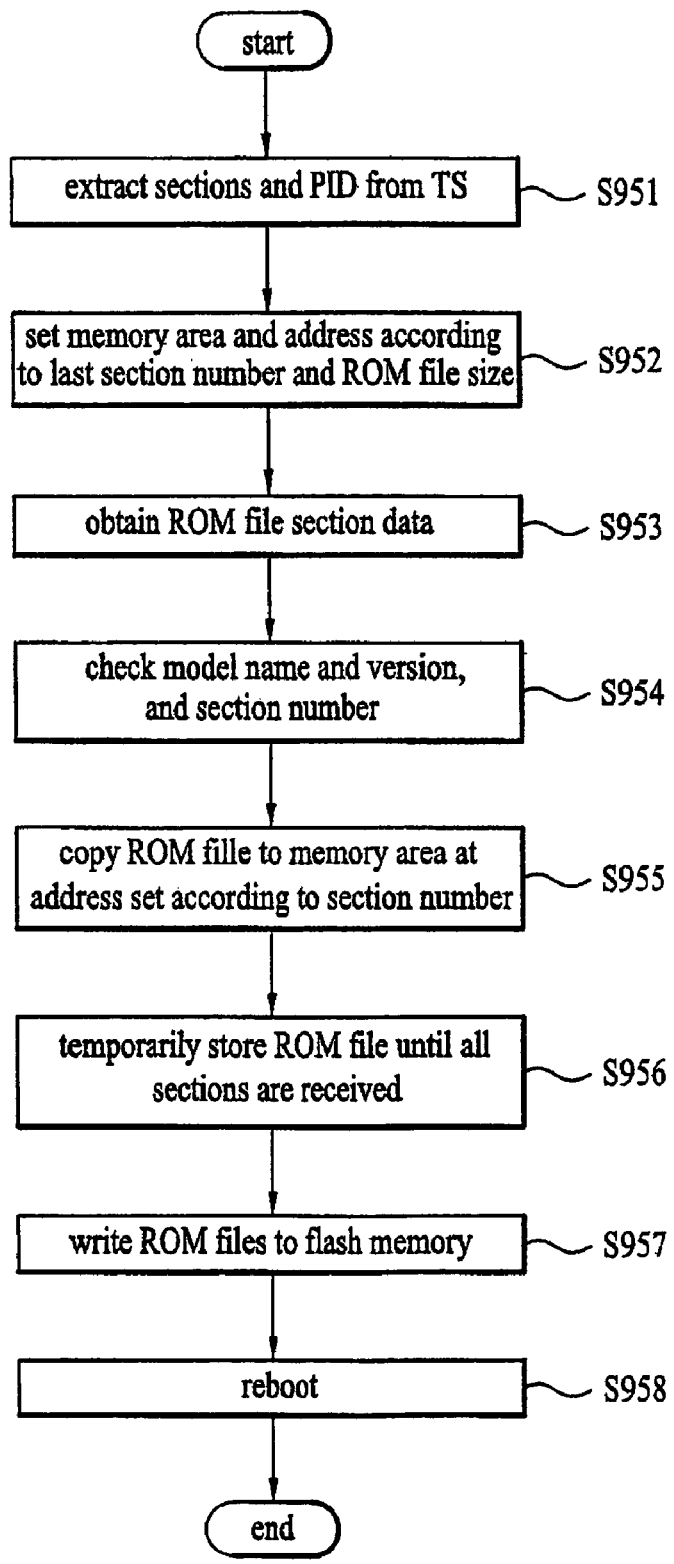
FIG. 9B is a flow chart of a second embodiment of the operation of a receiving side of a software download system using wireless communication according to the present invention.

FIG. 9B is a flow chart of a second embodiment of the operation of a receiving side of a software download system using wireless communication according to the present invention. Another example of the operation of the receiving side of the software download system using wireless communication according to the present invention will now be described with reference to FIG. 9B.

The steps of demodulating packets associated with a software program from a TS wirelessly received through the tuner unit 401 and writing the demodulated packets to the second memory 407 in the operation of the receiving side (i.e., the video device 200 such as a digital TV) in the software download procedure according to the present invention include steps S951, S952, S953, S954, S955, S956, S957, and S958 as follows.

First, a broadcast signal is received through the tuner unit 401. From a PID in TS packet data processed by the signal processor 402, the controller 405 determines whether or not it is necessary to download the TS packet data to a memory (for example, the second memory) 407 of the video device 200, i.e., whether or not a software program associated with the video device 200 is included in the received broadcast signal. When a software program associated with the video device 200 is included in the received broadcast signal, the controller 405 performs filtering to extract section data elements corresponding to the software program (S951).

Memory areas and addresses of the first memory 406 are set according to a last section number and a ROM file size of the section data element (S952).

Then, the contents of each of the section data elements are parsed to obtain section number and section length information as shown in FIG. 5C and to obtain core section data, which is actual ROM file data, from each section data element (S953).

A model name, a model version, and a section number in the section data element as shown in FIG. 5C are checked (S954).

If it is determined that the model name of the section data element is not identical to that of the video device 200 (S954), the procedure for downloading the software program is not performed.

When it is determined that the model name of the section data element is identical to that of the video device 200, the model version of the received software program is an upgraded version, and the section number of the section data element is a section number that has not yet been downloaded (S954), a ROM file of the section data element is copied to a memory area in the first memory 406 which corresponds to an address set according to the section number (S955).

In the embodiment of FIG. 9B, the software program is downloaded according to the model name, the model version, and the section number, and ROM file data of the section data elements are copied to the first memory 406 in arbitrary order.

Even when reception of a section data element has been interrupted due to bad broadcast environments, ROM file data of section data elements are continuously copied to the first memory 406 until all section data elements are received, provided that the model name of each of the section data elements is identical to that of the video device 200 and the model version of the received software program is an upgraded version, except when the section number of the section data element is identical to any section data element that has already been downloaded.

When ROM files of all the section data elements have been copied (S956), a CRC or checksum of the ROM file data in the first memory 406 is calculated to determine whether or not an error has occurred. If no error has occurred, the ROM file data is decompressed (for example according to the MPEG2 standard) and is then written to the second memory 407 (S957).

Here, a software program associated with a booting process of the video device 200 and a software program associated with an application for the video device 200 are written to their respective memory areas preset in the second memory 407, with reference to their ROM type.

When it is determined, based on the calculated CRC or checksum, that an error has occurred, the required software program must be downloaded again.

When the software program for download or upgrade has been normally downloaded to the second memory 407, the video device 200 is rebooted (S958).

Figure 10A:
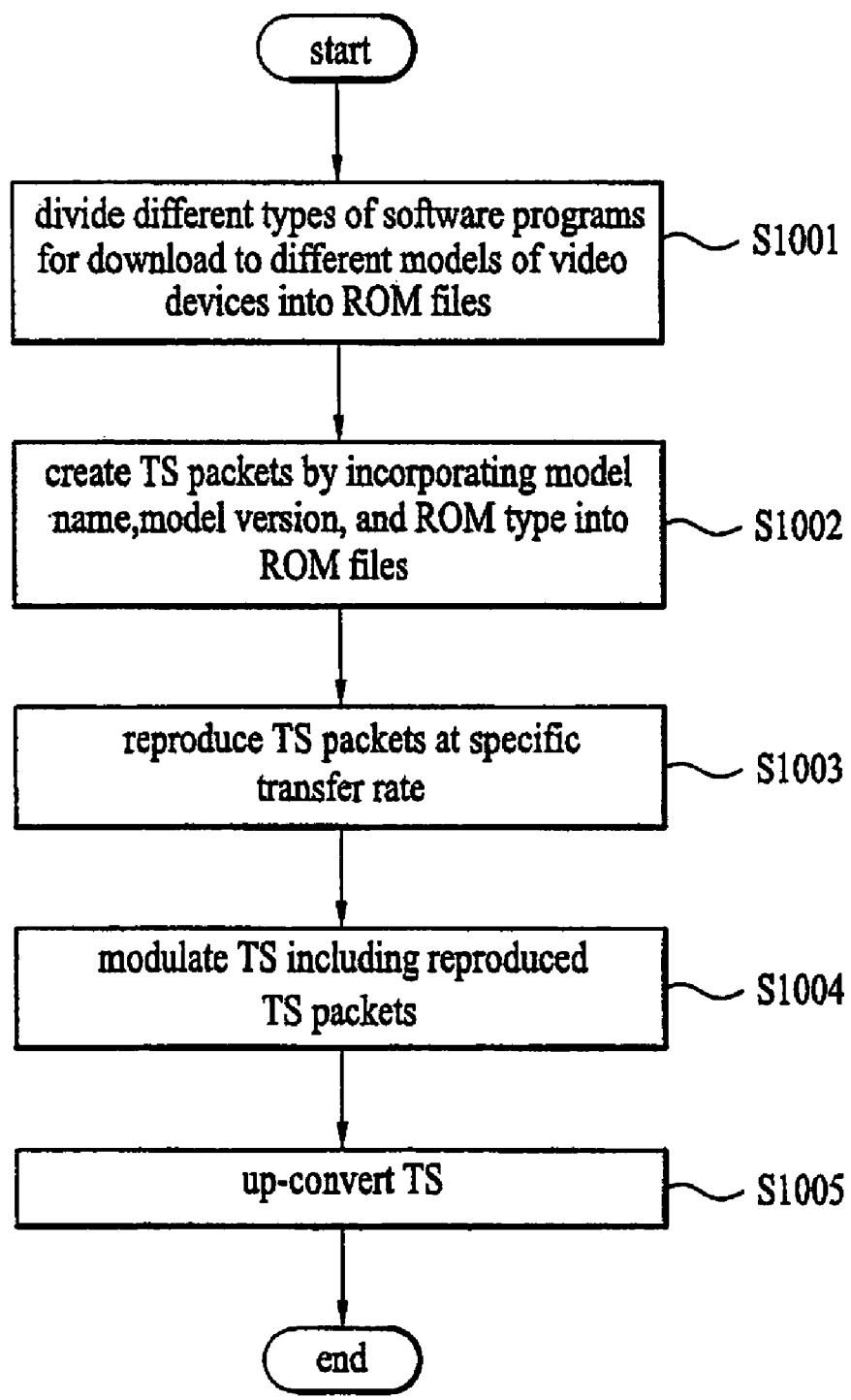
FIG. 10A is a flow chart of a third embodiment of the operation of a transmitting side of a software download system using wireless communication according to the present invention.

FIG. 10A is a flow chart of a third embodiment of the operation of a transmitting side of a software download system using wireless communication according to the present invention. Another example of the operation of the transmitting side of the software download system using wireless communication according to the present invention will now be described with reference to FIG. 10A.

The steps of inserting input software programs into TS packets and up-converting the TS packets in the operation of the transmitting side in the software download procedure according to the present invention include steps S1001, S1002, S1003, S1004, and S1005 as follows.

Two or more types of software programs are input in the embodiment of FIG. 10A, which is different from the embodiments of FIGS. 8A and 9A in which a single software program is input.

The software upgrade device 220 inputs two or more types of software programs to the wireless transmission device 230 (not shown).

Upon receiving the two or more types of software programs, the wireless transmission device 230 divides each of the software programs into a plurality of ROM files (see FIG. 3B) (S1001). For example, each of the software programs is divided into a plurality of ROM files according to the MPEG2 transmission standard.

The data input unit 311 of the wireless transmission device inserts ROM files corresponding to two or more types of software programs, which are to be downloaded to different models of video devices, into section structures of section data elements as shown in FIG. 5C according to the MPEG2 standard. Specifically, the data input unit 311 inserts ROM files (for example, first ROM files, second ROM files, and third ROM files), into which different types of software programs have been divided, between null packets arranged at certain intervals.

The divided ROM files are used to create TS packets, each of which includes a model name, a model version, and a ROM type (S1002). The TS packet also includes a PID, a table ID, a section length, a section number, a last section number, ROM file data, and CRC information (see FIG. 5C).

The created TS packets are reproduced at a specific transfer rate (S1003).

A TS including the reproduced TS packets is modulated (S1004).

The modulated TS is up-converted so that it can be transmitted according to a wireless communication scheme (S1005).

FIG. 10B is a flow chart of a third embodiment of the operation of a receiving side of a software download system using wireless communication according to the present invention. Another example of the operation of the receiving side of the software download system using wireless communication according to the present invention will now be described with reference to FIG. 10B.

The steps of demodulating packets associated with a software program from a TS wirelessly received through the tuner unit 401 and writing the demodulated packets to the second memory 407 in the operation of the receiving side (i.e., the video device 200 such as a digital TV) in the software download procedure according to the present invention include steps S1051, S1052, S1053, S1054, S1055, S1056, S1057, S1058, and S1059 as follows.

Different models of video devices 200 receive a broadcast signal through their tuner units 401 and transmit the received broadcast signal to their signal processors 402 (S1051). The signal processor 402 of each of the video devices 200 demodulates the broadcast signal into TS packets and transmits the TS packets to the controller 405.

From a PID in TS packet data processed by the signal processor 402, the controller 405 determines whether or not it is necessary to download the TS packet data to a memory (for example, the second memory) 407 of the video device 200, i.e., whether or not a software program associated with the video device 200 is included in the received broadcast signal. When a software program associated with the video device 200 is included in the received broadcast signal, the controller 405 performs filtering to extract section data elements corresponding to the software program (S1052).

Memory areas and addresses of the first memory 406 are set according to a last section number and a ROM file size of the section data element (S1053).

Then, the contents of each of the section data elements are parsed to obtain section number and section length information as shown in FIG. 5C and to obtain core section data, which is actual ROM file data, from each section data element (S11054).

A model name, a model version, and a section number in the section data element as shown in FIG. 5C are checked (S1055).

If it is determined that the model name of the section data element is not identical to that of the video device 200 (S1055), the procedure for downloading the software program is not performed.

When it is determined that the model name of the section data element is identical to that of the video device 200, the model version of the received software program is an upgraded version, and the section number of the section data element is a section number that has not yet been downloaded (S1055), a ROM file of the section data element is copied to a memory area in the first memory which corresponds to an address set according to the section number (S1056).

In the embodiment of FIG. 10B, the software program is downloaded according to the model name, the model version, and the section number, and ROM file data of the section data elements are copied to the first memory in arbitrary order.

Even when reception of a section data element has been interrupted due to bad broadcast environments, ROM file data of section data elements are continuously copied to the first memory until all section data elements are received, provided that the model name of each of the section data elements is identical to that of the video device 200 and the model version of the received software program is an upgraded version, except when the section number of the section data element is identical to any section data element that has already been downloaded.

When ROM files of all the section data elements have been copied (S1057), a CRC or checksum of the ROM file data in the first memory is calculated to determine whether or not an error has occurred. If no error has occurred, the ROM file data is decompressed (for example according to the MPEG2 standard) and is then written to the second memory (S1058).

Here, a software program associated with a booting process of the video device 200 and a software program associated with an application for the video device 200 are written to their respective memory areas preset in the second memory, with reference to their ROM type.

When it is determined, based on the calculated CRC or checksum, that an error has occurred, the required software program must be downloaded again.

When the software program for download or upgrade has been normally downloaded to the second memory, the video device 200 is rebooted (S1059).

Figure 11:
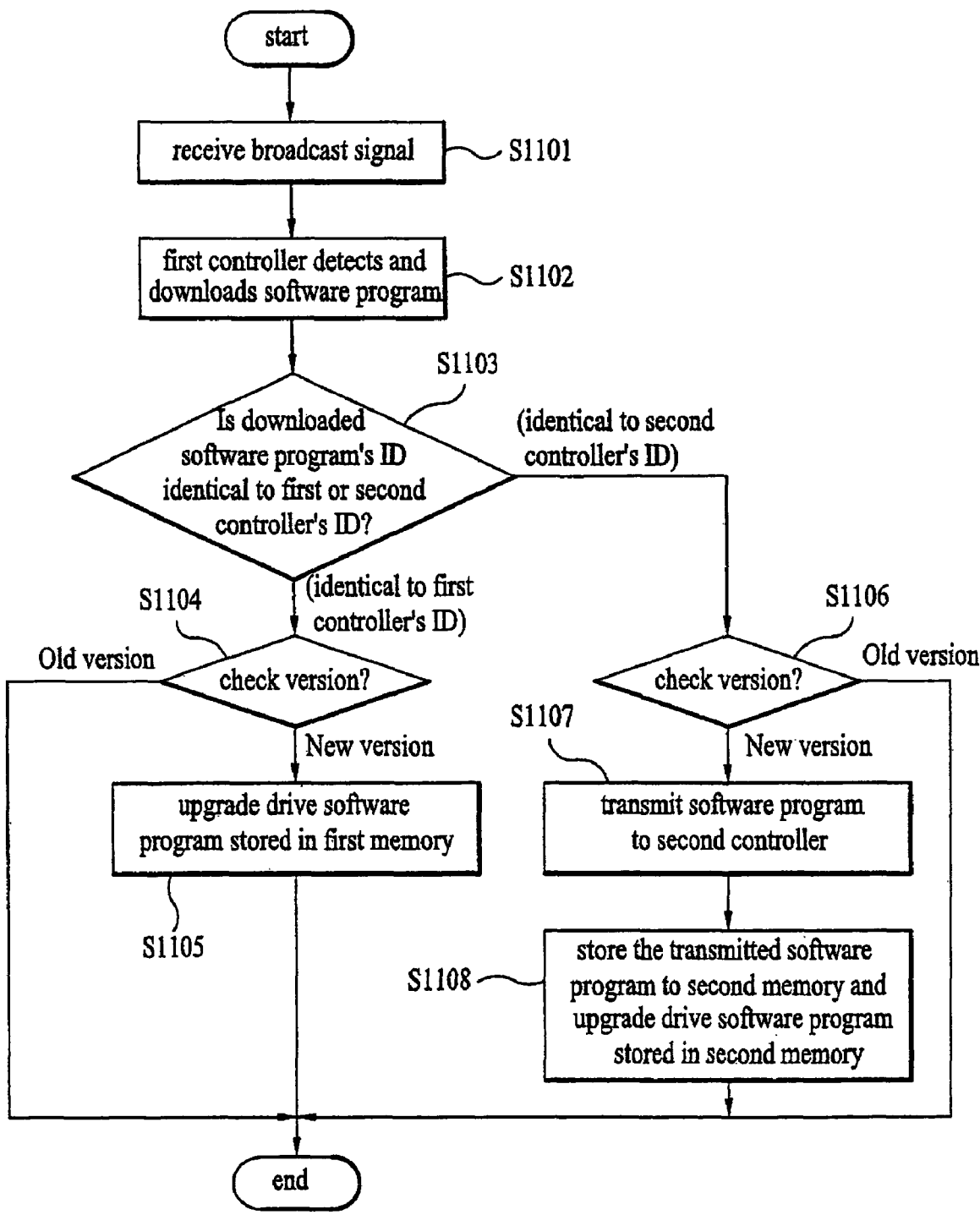
FIG. 11 is a flow chart of a second embodiment of a control method of a software download system using wireless communication according to the present invention.

FIG. 11 is a flow chart of a second embodiment of a control method of a software download system using wireless communication according to the present invention. The embodiment of the control method of the software download system using wireless communication according to the present invention will now be described with reference to FIG. 11. The embodiment of FIG. 11 is advantageous when two or more controllers are included in the video device. However, the embodiment of FIG. 11 is compatible with the embodiments of FIGS. 7-10 and can be implemented in conjunction therewith.

The method shown in FIG. 11 can be carried out using the device shown in FIG. 6 and thus a description thereof will be given reference to the components shown in FIG. 6.

The over-the-air download (OAD) scheme is a method of transmitting software programs associated with video devices in the same transport format as that of a broadcast signal over a specific channel during a period of time specified by the broadcast station.

When the user desires to upgrade software programs of their video device, the user powers on the video device during the specified period and tunes the video device to the specific channel.

The digital tuner 611 receives a broadcast signal of the specific channel (S1101).

The first controller 614 detects a software program from the broadcast signal and allows the software program to be downloaded (S1102).

The first controller 614 checks an ID of the detected and downloaded software program in order to determine whether the downloaded software program is associated with the first controller 614 or with the second controller 627 (S1103).

The first controller 614 stores therein IDs of the first and second controllers 614 and 627. Thus, the first controller 614 compares the ID of the downloaded software program with the stored IDs to determine whether the ID of the downloaded software is identical to the ID of the first controller 614 or to the ID of the second controller 627 (S1103).

When it is determined at step S1103 that the ID of the downloaded software is identical to the ID of the first controller 614, the first controller 614 checks the version of the received software program (S1104).

When it is determined at step S1104 that the version of the received software program is newer than the version stored in the first controller 614, the first controller 614 upgrades the drive software program stored in the first memory 613 with the received software program (S1105).

When it is determined at step S1103 that the ID of the downloaded software is identical to the ID of the second controller 627, the first controller 614 checks the version of the received software program (S1106).

When it is determined at step S1106 that the version of the received software program is newer than the version stored in the first controller 614, the first controller 614 transmits the received software program to the second controller 627 (S1107).

Then, the second controller 627 upgrades the drive software program stored in the second memory 626 with the received software program by storing the received software program in the second memory 626 (S1108).

As described above, a video device including a software upgrade function using wireless communication and a method for controlling the same according to the present invention have no need to repeat device connection and disconnection processes to download software programs associated with the video device and also significantly reduce the time required to download software programs since the software programs are transmitted through radio frequencies.

For example, it takes about 45 seconds to download a 1.3 MB ROM file when using a radio frequency according to the present invention, whereas it takes about 2 minutes and 10 seconds to download the same when using the RS-232 cable. Also, it takes about 2 minutes to download a 3.4 MB ROM file when using a radio frequency according to the present invention, whereas it takes about 5 minutes and 40 seconds to download the same when using the RS-232 cable. Thus, the present invention significantly reduces the time required to download software programs, compared to the conventional method.

As is apparent from the above description, a method and apparatus for upgrading software of a video device according to the present invention has a variety of advantages. For example, the time required to download a software program can be significantly reduced by incorporating model name and model version information into each of the section data elements associated with the software program, compared to when it is necessary to download the section data elements, starting from the first section data element.

In addition, two or more types of software programs can be transmitted simultaneously, thereby increasing software download efficiencies.

Further, when a single video device includes two or more controllers, software programs associated with all the controllers can be received simultaneously to upgrade all the controllers.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for upgrading software of a receiving terminal, the method comprising:
    receiving transport stream (TS) packets of a transport stream from a broadcaster via a wireless communication scheme, the transport stream configured by:
    dividing at least one software program associated with the receiving terminal into a plurality of files; and
    inserting the plurality of files into section structures corresponding to the TS packets of the transport stream, the TS packet of any one of the plurality of files being inserted between null packets;
    storing the plurality of files included in the TS packets in a memory of the receiving terminal; and
    upgrading the software of the receiving terminal according to the stored plurality of files; each of the TS packets includes a packet identifier (PID), wherein each of the plurality of files is inserted into a separate section structure, each file including a section number and section length information, and core section data, and wherein a first section structure includes a model name and model version information.

2. The method according to claim 1, wherein the storing the plurality of files included in the TS packets includes:
    comparing the model name and model version in a first section structure with a preset model name and model version for the receiving terminal; and
    sequentially downloading file data of the section structures having the same PID, starting from file data of the first section structure and ending with file data of a last section structure, when the model name in the first section structure matches the preset model name and the model version in the first section structure supersedes the preset model version, wherein the software of the receiving terminal is upgraded using the downloaded file data of the at least one software program.

3. The method according to claim 1, wherein a first section structure of the section structures includes a packet identifier (PID), a table ID, a section length, a section number, a last section number, a model name, a model version, file data, and error checking byte information, and each of a second to a last section structure of the section structures includes a PID, a table ID, a section length, a section number, a last section number, file data, and error checking byte information.

4. The method according to claim 1, wherein each of the section structures includes a packet identifier (PID), a table ID, a section length, a section number, a last section number, a model name, a model version, file data, a read only memory (ROM) type, and error checking byte information.

5. The method according to claim 1, wherein the at least one software program includes a plurality of model-specific types of software programs, and wherein each of the at least one software program is associated with one of a plurality of model types of receiving terminals and is divided into a plurality of files.

6. The method according to claim 5, wherein the inserted plurality of files include a plurality of file data elements into which the plurality of model-specific types of software programs have been divided.

7. The method according to claim 1, wherein the storing the plurality of files included in the TS packets includes:
    downloading, by a first controller of the receiving terminal, all files of the at least one software program;
    determining, by the first controller, whether the receiving terminal includes a different controller associated with the downloaded software program; and
    transmitting the downloaded software program to the different controller if the first controller determines that the different controller is present, wherein the software of one of the first controller and the different controller of the receiving terminal is upgraded according to the downloaded software program.

8. The method according to claim 7, wherein the determining, by the first controller, whether the different controller is present, includes:
    comparing ID and version information of the downloaded software program with stored ID and version information of each controller in the receiving terminal; and
    determining that a specific controller is associated with the downloaded software program if the ID of the downloaded software program matches with the ID of the specific controller and the version of the downloaded software program supersedes the version of the specific controller.

9. The method according to claim 1, wherein the wireless communication scheme utilizes an over-the-air download channel.

10. The method according to claim 1, whereas each of the TS packets includes a packet identifier (PID), wherein each of the plurality of files is inserted into a separate section structure, each file including a section number and section length information, and core section data, and wherein each of the section structures includes a model number and model version information.

11. The method according to claim 10, wherein the storing the plurality of files included in the TS packets includes:
    comparing the model name and model version in the section structure with a preset model name and model version for the receiving terminal;
    setting a memory area and an address in a first memory according to the number of the last section and a size of a corresponding file and copying file data of each of the section structures to the set memory area and address, when the model name in the first section structure matches the preset model name and the model version in the first section structure supersedes the preset model version, and
    downloading the file data of all of the section structures to a second memory, when the file data of all of the section structures have been copied to the first memory, wherein the software of the receiving terminal is upgraded using the downloaded file data of the at least one software program.

12. The method according to claim 11, wherein the file data of each of the section structures is copied to the address of the first memory according to the section number.

13. The method according to claim 11, wherein the downloaded file data includes:
    file data associated with a booting process that is downloaded to a first area preset in the second memory; and
    file data associated with an application that is downloaded to a second area preset in the second memory.

14. The method according to claim 1, wherein the null packets are arranged at specific intervals in a single transport stream.

15. A method for upgrading software of a receiving terminal, the method comprising:
    receiving on a specific channel transport stream (TS) packets of a transport stream from a broadcaster via a wireless communication scheme, the transport stream being configured by:
        dividing each of a plurality of model-specific types of software programs into a plurality of files, each of the software programs being associated with one of a plurality of model types of receiving terminals; and
        inserting the plurality of files into section structures corresponding to the TS packets of the transport stream, the TS packet of any one of the plurality of files being inserted between null packets;
    storing the plurality of files included in the TS packets in a memory of the receiving terminal; and
    upgrading the software of the receiving terminal according to the stored files; each of the TS packets includes a packet identifier (PID), wherein each of the plurality of files is inserted into a separate section structure, each file including a section number and section length information, and core section data, and wherein a first section structure includes a model name and model version information.

16. The method according to claim 15, wherein the null packets are arranged at specific intervals in a single transport stream and the specific intervals are defined by an arrangement of an equal number of null packets on either side of the TS packet of each of the plurality of files.

17. The method according to claim 15, wherein the storing the plurality of files included in the TS packets includes:
    comparing the model name and model version in a first section structure with a preset model name and model version for the receiving terminal; and
    sequentially downloading file data of the section structures having the same PID, starting from file data of the first section structure and ending with file data of a last section structure, when the model name in the first section structure matches the preset model name and the model version in the first section structure supersedes the preset model version.

18. The method according to claim 15, wherein the storing the plurality of files included in the TS packets includes:
    comparing the model name and model version in a first section structure with a preset model name and model version for the receiving terminal;
    setting a memory area and an address in a first memory according to a number of a last section and a size of a corresponding file and copying file data of each of the section structures to the set memory area and address when the model name in the first section structure matches the preset model name and the model version in the first section structure supersedes the preset model version; and
    downloading the file data of all section structures to a second memory when the file data of all of the section structures have been copied to the first memory.

19. The method according to claim 15, wherein the storing the plurality of files included in the TS packets includes:
    downloading, by a first controller of the receiving terminal, all files of the at least one software program;
    determining, by the first controller, whether the receiving terminal includes a different controller associated with the downloaded software program; and
    transmitting the downloaded software program to the different controller if the first controller determines that the different controller is present.

* * * * *

UNITED STATES PATENT AND TRADEMARK OFFICE
CERTIFICATE OF CORRECTION

PATENT NO.           : 7,818,737 B2                              Page 1 of 1
APPLICATION NO.      : 11/345287
DATED                : October 19, 2010
INVENTOR(S)          : Su Hyun Shin et al.

It is certified that error appears in the above-identified patent and that said Letters Patent is hereby corrected as shown below:

On the Title page, item [30] should read:

Foreign Application Priority Data

| | | |
|---|---|---|
| Feb. 3, 2005 | (KR) | 10-2005-0010023 |
| Aug. ~~25~~ 26, 2005 | (KR) | 10-2005-0078367 |
| Aug. 26, 2005 | (KR) | 10-2005-0079040 |
| Aug. 30, 2005 | (KR) | 10-2005-0080152 |

Signed and Sealed this
Twenty-fifth Day of January, 2011

David J. Kappos
*Director of the United States Patent and Trademark Office*